June 7, 1966  V. O. BLANEY  3,254,932
CLIP-ON WELDING GLASSES
Filed Dec. 26, 1962

INVENTOR.
VERNON O. BLANEY
BY Whittemore, Hulbert
& Belknap
ATTORNEYS

United States Patent Office 3,254,932
Patented June 7, 1966

3,254,932
CLIP-ON WELDING GLASSES
Vernon O. Blaney, 6011 Harrell Ave., Detroit 13, Mich.
Filed Dec. 26, 1962, Ser. No. 247,003
1 Claim. (Cl. 351—47)

This invention relates to welding glasses and more particularly to a pair of clip-on welding glasses adapted to be removably affixed over a pair of conventional prescription type spectacles or eye glasses.

In oxygen-acetylene welding it is the common practice to utilized a pair of welding goggles with relatively dark lenses which are placed on the head over the eyes so as to shield the eyes from the relatively bright flame created by the welding operation. In such a case it is necessary for a person wearing conventional spectacles or eye glasses to remove them prior to placing the welding goggles on the head. This creates a considerable problem for a welder since he has to remove the eye glasses many times during the day. It is sometimes required to weld for a short period of time and then examine and read blue prints, plans, or the like with conventional eye glasses. This requires a welder to remove the welding goggles and replace them with the conventional eye glasses prior to reading the plans. This not only results in considerable effort on the part of the welder, but also requires valuable time which is lost at considerable expense in changing over from the eye glasses to the welding goggles and vice-versa.

The present invention eliminates the requirement of conventional welding goggles by providing a pair of clip-on welding glasses which is adapted to be affixed to the conventional spectacles or eye glasses, with the upper portion of the welding glasses designed to protect the eye against the dazzling and blinding effects of the brilliant light created by the welding operation without destroying vision through such upper portion. At the same time, the lower portion of the welding glasses is designed to permit ordinary reading of plans or the like in ordinary daylight. This is accomplished by providing the clip-on welding glasses with a pair of colored lens elements with the upper portion thereof being substantially darker than the lower portion thereof. With such a construction, a welder may perform the welding operation by looking through the relatively dark upper portion of the welding glasses and may perform his other duties in the shop, other than welding, by looking through the lower and relatively lighter portion of the welding glasses.

It is an object of the present invention to provide a pair of clip-on welding glasses comprising a pair of lenses, each lens being made from transparent colored material and having one portion thereof more deeply colored than the other portion and through which the welder looks when performing the welding operation.

Another object of the present invention is to provide a pair of clip-on welding glasses of the aforementioned type wherein each lens is of substantially uniform thickness, with one part thereof being more deeply colored than another part and through which the welder looks when performing the welding operation.

A further object of the present invention is to provide a pair of welding glasses adapted to be removably affixed over a pair of spectacles, said welding glasses comprising a mounting cross member, a pair of lens elements, means securing the elements to the mounting member in depending relation therefrom, and a pair of engaging elements projecting from the mounting member and engageable over the rear face of the spectacles, said lens elements each comprising transparent colored material with the upper portion thereof being more deeply colored than the remaining portion so as to protect the eyes of the welder when performing a welding operation.

A still further object of the present invention is to provide a pair of welding glasses of the aforementioned type wherein the lens elements each comprises transparent colored material of substantially uniform thickness and the same relatively light color throughout, and auxiliary lenses in surface-to-surface contact with the upper portions of the lens elements and secured to the mounting member, said auxiliary lenses being more deeply colored than the lens elements to protect the eyes of the welder from the brilliant light created by the welding operation.

It is thus another object of the present invention to provide a simplified low cost, lightweight, glare proof structure of the afore-mentioned type having certain advantages contributing to efficiency, reliability and long life as well as ease of maintenance.

Further objects and advantages of the present invention will be apparent from the following description, reference being had to the accompanying drawing wherein a preferred form of the present invention is clearly shown.

Figure 1:
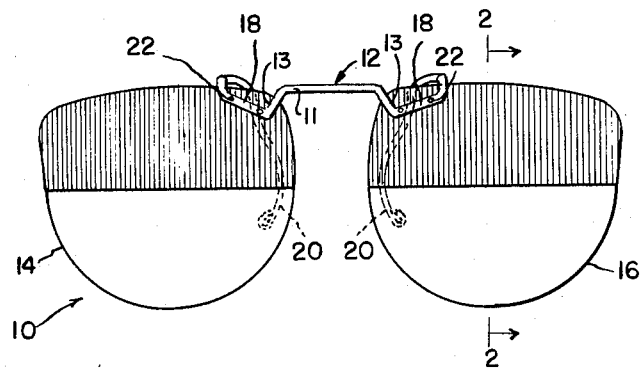
FIGURE 1 is a front elevation of the pair of clip-on welding glasses.

Referring now to the drawing, there is illustrated a pair of clip-on welding glasses designated in its entirety by the numeral 10 and comprising a flexible mounting cross member or wire clip 12 of any suitable configuration and a pair of lens elements 14 and 16 of arcuate cross-section which are appropriately secured to the mounting member 12 in a manner to be subsequently described. The mounting cross member 12 may be made from metal or wire and is flexible to permit the mounting of the clip-on welding glasses 10 on a pair of conventional spectacles or eye glasses. The pair of clip-on welding glasses 10 is used to protect the welder's eyes from brilliant rays, glare and analogous annoying light conditions produced during the oxygen-acetylene welding operation.

Specifically, the mounting cross member 12 includes a substantially straight center portion 11 forming a bridge, a pair of relatively straight short arms 13 and a pair of integral offset mounting arms 18, each arm 18 having an integral elongated resilient rearwardly turned downwardly extending engaging element 20 which is designed to engage the back side of the pair of conventional eye glasses. The short arms 13 are located at the ends of the center portion 11 and diverge downwardly and away from the center portion 11. The mounting arms 18 are relatively straight and are located at the ends of the short arms 13 and diverge upwardly and away from the center portion 11 as illustrated in FIGURE 1. The lens elements 14 and 16 are secured to the arms 18 by a plurality of screws and nuts 22 or the like.

Each lens 14 and 16 may be made either of glass or plastic material or the like and colored throughout. The density of the color varies as will subsequently appear so as to permit the pair of clip-on welding glasses 10 to be used not only during the welding operation, but also to be used to perform various jobs which require normal vision intermediate the welding operations without requiring the removal of the welding glasses 10.

In particular, it is preferred that the lens elements 14 and 16 be made of transparent colored plastic material. The lens elements are of substantially uniform thickness throughout and are cut and formed to the desired shape and contour as illustrated in the drawing. While it is intended that plastic material be utilized, it should be understood that glass, celluloid, or other suitable material may be utilized without departing from the spirit of the present invention.

Figures 2, 3:
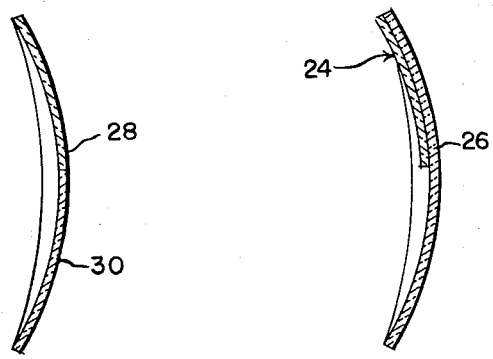
FIGURE 2 is a sectional view taken on line 2—2 of FIGURE 1 and illustrating the preferred embodiment of the present invention.
FIGURE 3 is a sectional view also taken on line 2—2 of FIGURE 1 and illustrating another embodiment of the present invention.

The preferred embodiment illustrated in FIGURE 2 illustrates a lens element of substantially uniform thickness and of desired shape, uniform curvature, and contour. The lens is uniformly tinted or colored throughout and is of the same density as used with ordinary sunglasses. In order to make use of such a construction, it is necessary to provide each lens element with an auxiliary lens 24 which is suitably curved and shaped so as to have the inner surface 26 thereof in surface-to-surface contact with the rear surface of the upper portion of the lens element. The auxiliary lens 24 is of uniform thickness and curvature and is uniformly colored, shaded, or tinted to a greater density than the lens element so as to provide suitable protection for the welder during the welding operation. The lens element may be made from relatively light green plastic material such as Polaroid No. 711C, while the auxiliary lens 24 may be made from relatively dark green plastic material for welding shields, identification No. 1101. The auxiliary lens 24 is secured to the arm 18 by the fastening means 22. Generally no other means are required to hold the preformed auxiliary lens 24 in contact with the lens element, although a suitable adhesive may be used at the edges of the lens element and auxiliary lens.

FIGURE 3 illustrates a typical lens element which is colored throughout. The upper portion 28 has a deeper or darker tint, shade, or color than the lower portion 30 and preferably, the darker colored or shaded portion is more sharply defined from the lower lighter shaded portion. As an example, the lower portion 30 may be made from relatively light green plastic material such as Polaroid No. 711C, while the upper portion is made from relatively dark green plastic material for welding shields, identification No. 1101. The adjacent edges of the upper and lower portions 28 and 30 are held together by a suitable adhesive. The lens element shown in FIGURE 2 is of substantially uniform thickness and curvature, with the upper portion 28 uniformly colored, shaded, or tinted to a greater density than the lower portion 30.

In operation, the pair of clip-on welding glasses 10 is affixed to the conventional eye glasses such that the downwardly extending engaging elements 20 grip the rear, face, or side of the frame of the eye glasses. With such an arrangement, the lens elements 14 and 16 overlie the lenses of the eye glasses. When welding, the welder looks through the relatively dark upper portions of the welding glasses. When it is required to read prints or to perform other duties in the shop, the welder looks through the relatively light lower portions of the clip-on welding glasses 10. It has been found that the sparks produced by the welding operation do not stick to the plastic material.

The drawing and the foregoing specification constitute a description of the improved clip-on welding glasses in such full, clear, concise, and exact terms as to enable any person skilled in the art to practice the invention, the scope of which is indicated by the appended claim.

What I claim as my invention is:

A pair of welding glasses adapted to be removably affixed over a pair of spectacles: said welding glasses comprising a flexible mounting cross member having a substantially straight center portion forming a bridge, a pair of relatively straight short arms at the ends of said center portion diverging downwardly and away from said center portion, a pair of relatively straight mounting arms at the ends of said short arms diverging upwardly and away from said center portion, and a pair of elongated resilient spectacles engaging elements connected to the ends of said mounting arms; a pair of transparent colored lens elements of arcuate cross-section; fastening means securing the upper and inner portions of said lens elements to said mounting arms with said mounting arms in contact with the front side of said lens elements; said engaging elements extending rearwardly over the upper edges of said lens elements and then downwardly and inwardly toward each other adjacent the rear side of said lens elements; said lens elements each comprising a piece of transparent colored material of substantially uniform thickness; transparent colored auxiliary lenses of arcuate cross-section in surface to surface contact with the upper portions of said lens elements; said fastening means also securing said auxiliary lenses to said mounting arms; said auxiliary lenses being more deeply colored than said lens elements and of substantially uniform thickness; the lower ends of said engaging elements terminating intermediate the lower edges of said auxiliary lenses and the lower edges of said lens elements, said engaging elements being adapted to yieldingly apply the welding glasses to the spectacles when the welding glasses are engaged over the spectacles.

References Cited by the Examiner

UNITED STATES PATENTS

| | | | |
|---|---|---|---|
| 1,239,691 | 9/1917 | Howe | 351—45 |
| 1,257,667 | 2/1918 | Barr | 351—45 |
| 2,339,078 | 1/1944 | Ingwersen. | |
| 2,362,637 | 11/1944 | Keehn. | |
| 2,378,493 | 6/1945 | Miles | 351—49 |
| 2,770,167 | 11/1956 | Passet | 351—47 |

FOREIGN PATENTS

| | | |
|---|---|---|
| 120,138 | 1/1947 | Australia. |
| 1,235,406 | 5/1960 | France. |
| 488,958 | 7/1938 | Great Britain. |

References Cited by the Applicant

UNITED STATES PATENTS

| | | |
|---|---|---|
| 950,255 | 2/1910 | Alles. |
| 2,409,356 | 10/1946 | Hutchings. |
| 2,675,740 | 4/1954 | Barkley. |

DAVID H. RUBIN, *Primary Examiner.*